(12) United States Patent
Hortop (10) Patent No.: US 11,527,923 B2
(45) Date of Patent: Dec. 13, 2022

(54) BIDIRECTIONAL WIRELESS POWER TRANSFER WITH AUXILIARY DEVICES

(71) Applicant: Rivian IP Holdings, LLC, Plymouth, MI (US)

(72) Inventor: Matthew Kenneth Hortop, Ann Arbor, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 314 days.

(21) Appl. No.: 16/942,030

(22) Filed: Jul. 29, 2020

(65) Prior Publication Data

US 2022/0037934 A1 Feb. 3, 2022

(51) Int. Cl.
| | | |
|---|---|---|
| *H02J 50/80* | (2016.01) | |
| *B60R 16/03* | (2006.01) | |
| *H02J 50/10* | (2016.01) | |
| *H02J 50/00* | (2016.01) | |

(52) U.S. Cl.
CPC .............. *H02J 50/80* (2016.02); *B60R 16/03* (2013.01); *H02J 50/005* (2020.01); *H02J 50/10* (2016.02)

(58) Field of Classification Search
CPC .......... H02J 50/80; H02J 50/005; H02J 50/10; H02J 2310/48; H02J 50/12; B60R 16/03; Y02T 10/72; Y02T 90/14; Y02T 10/70; Y02T 10/7072; Y02T 90/16; Y04S 10/126; B60L 1/006; B60L 2210/10; B60L 53/12; B60L 55/00; H04B 5/0031; H04B 5/0037; Y02E 60/00; H02M 3/33584
See application file for complete search history.

(56) References Cited

U.S. PATENT DOCUMENTS

| | | | | |
|---|---|---|---|---|
| 9,744,858 | B2 * | 8/2017 | Hall ..................... | H02J 50/502 |
| 11,021,073 | B1 * | 6/2021 | Gauthier ................ | H02M 3/00 |
| 2011/0006611 | A1 * | 1/2011 | Baarman ................ | H02J 50/40 |
| | | | | 307/104 |
| 2011/0089885 | A1 * | 4/2011 | Bowden .................. | B60R 16/03 |
| | | | | 320/101 |
| 2013/0106346 | A1 * | 5/2013 | Salter ..................... | H02J 50/60 |
| | | | | 320/108 |
| 2013/0214732 | A1 * | 8/2013 | Nowottnick ............ | H02J 50/80 |
| | | | | 320/108 |

(Continued)

*Primary Examiner* — Jared Fureman
*Assistant Examiner* — Michael J Warmflash
(74) *Attorney, Agent, or Firm* — Clements Bernard Baratta; Christopher L. Bernard (57) ABSTRACT

Disclosed embodiments include apparatuses, systems, and methods for transferring electrical power between an electrical power system of a vehicle and another device. In an illustrative embodiment, an apparatus includes a wireless transfer unit electrically coupled with a high voltage system of a vehicle and configured to enable wireless bidirectional power exchange between the high voltage system and an auxiliary device. The high voltage system is operable to power a drivetrain of the vehicle and the auxiliary device is separate from the vehicle and configured to at least one of provide electric power to and receive power from the high voltage system. A transfer control unit is configured to communicate with the wireless transfer unit and control at least one parameter specifying a transfer of electrical power between the high voltage system and the auxiliary device.

20 Claims, 8 Drawing Sheets

(56) References Cited

U.S. PATENT DOCUMENTS

| | | | |
|---|---|---|---|
| 2013/0249682 A1* | 9/2013 | Van Wiemeersch | B60L 50/16 320/108 |
| 2014/0009261 A1* | 1/2014 | Iwanaga | G07C 9/28 340/5.32 |
| 2014/0125277 A1* | 5/2014 | Van Wiemeersch | H02J 50/10 320/108 |
| 2014/0176057 A1* | 6/2014 | Van Wiemeersch | H02J 50/12 320/108 |
| 2014/0203770 A1* | 7/2014 | Salter | H02J 50/10 320/108 |
| 2014/0239888 A1* | 8/2014 | Chen | H02J 50/10 320/108 |
| 2014/0265555 A1* | 9/2014 | Hall | H02J 50/50 307/9.1 |
| 2014/0347009 A1* | 11/2014 | Hongo | H02J 50/90 320/108 |
| 2015/0018051 A1* | 1/2015 | Nakayama | H04M 1/04 455/573 |
| 2015/0306963 A1* | 10/2015 | Van Wiemeersch | B60L 7/14 320/108 |
| 2016/0221441 A1* | 8/2016 | Hall | H02J 50/80 |
| 2017/0093195 A1* | 3/2017 | Lee | G08C 17/02 |
| 2017/0194808 A1* | 7/2017 | Pasternak | H02J 50/12 |
| 2018/0159379 A1* | 6/2018 | Kottas | H02J 50/12 |
| 2020/0139843 A1* | 5/2020 | Park | B60L 53/36 |
| 2020/0223366 A1* | 7/2020 | Heinz | E05B 47/0002 |
| 2020/0361360 A1* | 11/2020 | Parker | B60P 3/36 |
| 2020/0381928 A1* | 12/2020 | Isaksson | H01M 50/204 |

\* cited by examiner

BIDIRECTIONAL WIRELESS POWER TRANSFER WITH AUXILIARY DEVICES

INTRODUCTION

The present disclosure relates to apparatuses, systems, and methods for transferring electrical power between an electrical power system of a vehicle and another device.

The statements in this section merely provide background information related to the present disclosure and may not constitute prior art.

With the increased use of portable electronic devices, individuals increasingly desire outlets and other interfaces to provide power to and/or charge batteries in these devices. In addition to ubiquitous 12-volt "lighter" sockets, today's vehicles commonly include universal serial bus (USB) jacks to which individuals may connect power cords for global positioning system (GPS) devices, smartphones, entertainment devices, and portable computing devices. Some vehicles include power inverters that provide one or more household-style, alternating current (AC) two- or three-prong sockets to provide AC power for devices including without limitation televisions, entertainment systems, and other AC-powered devices.

When a vehicle is operating, mechanically-powered generators may produce electrical power that may be used to recharge the vehicle's own batteries as well as to power the vehicle's system and provide electrical power via the previously-described outlets. When a vehicle is not operating, electrical power is provided by the vehicle's batteries and, thus, the electrical power available via the outlets is limited and use of the outlets may deplete the vehicle's batteries. Further, when the vehicle is an electrically-powered vehicle, any electrical power drawn via the outlets may deplete electrical power needed by the powertrain of the vehicle to motivate the vehicle. Thus, while individuals may wish to take advantage of electrical power that may be available from a vehicle, the use of the vehicle's electrical power should be controlled to enable the vehicle to retain sufficient electrical power to operate the vehicle's systems.

SUMMARY

Disclosed embodiments include apparatuses, systems, and methods for transferring electrical power between an electrical power system of a vehicle and another device.

In an illustrative embodiment, an apparatus includes a wireless transfer unit electrically coupled with a high voltage system of a vehicle and configured to enable wireless bidirectional power exchange between the high voltage system and an auxiliary device. The high voltage system is operable to power a drivetrain of the vehicle and the auxiliary device is separate from the vehicle and configured to at least one of provide electric power to and receive power from the high voltage system. A transfer control unit is configured to communicate with the wireless transfer unit and control at least one parameter specifying a transfer of electrical power between the high voltage system and the auxiliary device.

In another illustrative embodiment, a vehicle includes a vehicle body including at least one receiving section including a cabin configured to receive an operator, a truckbed, and a trunk. A drivetrain is configured to motivate the vehicle. An operator control system is configured to allow the operator to direct operations of the vehicle. A high voltage system is operable to power the drivetrain. A wireless transfer unit is positioned in the receiving section and is electrically coupled with the high voltage system and configured to enable wireless bidirectional power exchange between the high voltage system and an auxiliary device. The high voltage system is operable to power a drivetrain of the vehicle. The auxiliary device is separate from the vehicle and is configured to at least one of provide electric power to and receive power from the high voltage system. A transfer control unit is configured to communicate with the wireless transfer unit and control at least one parameter specifying a transfer of electrical power between the high voltage system and the auxiliary device.

In a further illustrative embodiment, a method includes enabling wireless power exchange between a high voltage system of a vehicle and an auxiliary device. The high voltage system is operable to power a drivetrain of the vehicle. The auxiliary device is separate from the vehicle and configured to at least one of provide electric power to and receive power from the high voltage system. A parameter setting is received specifying a transfer of electrical power between the high voltage system and the auxiliary device. The parameter setting includes a setting chosen from at least one of a quantity of electrical power to be transferred between the high voltage system and the auxiliary device and a rate of electrical power transfer between the high voltage system and the auxiliary device.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

DETAILED DESCRIPTION

The following description is merely illustrative in nature and is not intended to limit the present disclosure, application, or uses. It will be noted that the first digit of each of the three-digit reference numbers corresponds to the figure number in which the element first appears.

By way of a non-limiting introduction and overview, in various embodiments, an apparatus includes a wireless transfer unit electrically coupled with a high voltage system of a vehicle and configured to enable wireless bidirectional power exchange between the high voltage system and an auxiliary device. The high voltage system is operable to power a drivetrain of the vehicle. The auxiliary device is separate from the vehicle and configured to at least one of provide electric power to and receive power from the high voltage system. A transfer control unit is configured to communicate with the wireless transfer unit and to control at least one parameter specifying a transfer of electrical power between the high voltage system and the auxiliary device.

Now that an overview has been given, details of various embodiments will be explained by way of non-limiting examples given by way of illustration only and not of limitation.

The following description explains, by way of illustration only and not of limitation, various embodiments of systems, apparatuses, and methods for helping an operator to benefit from identifying an alternative route of travel.

Figure 1:
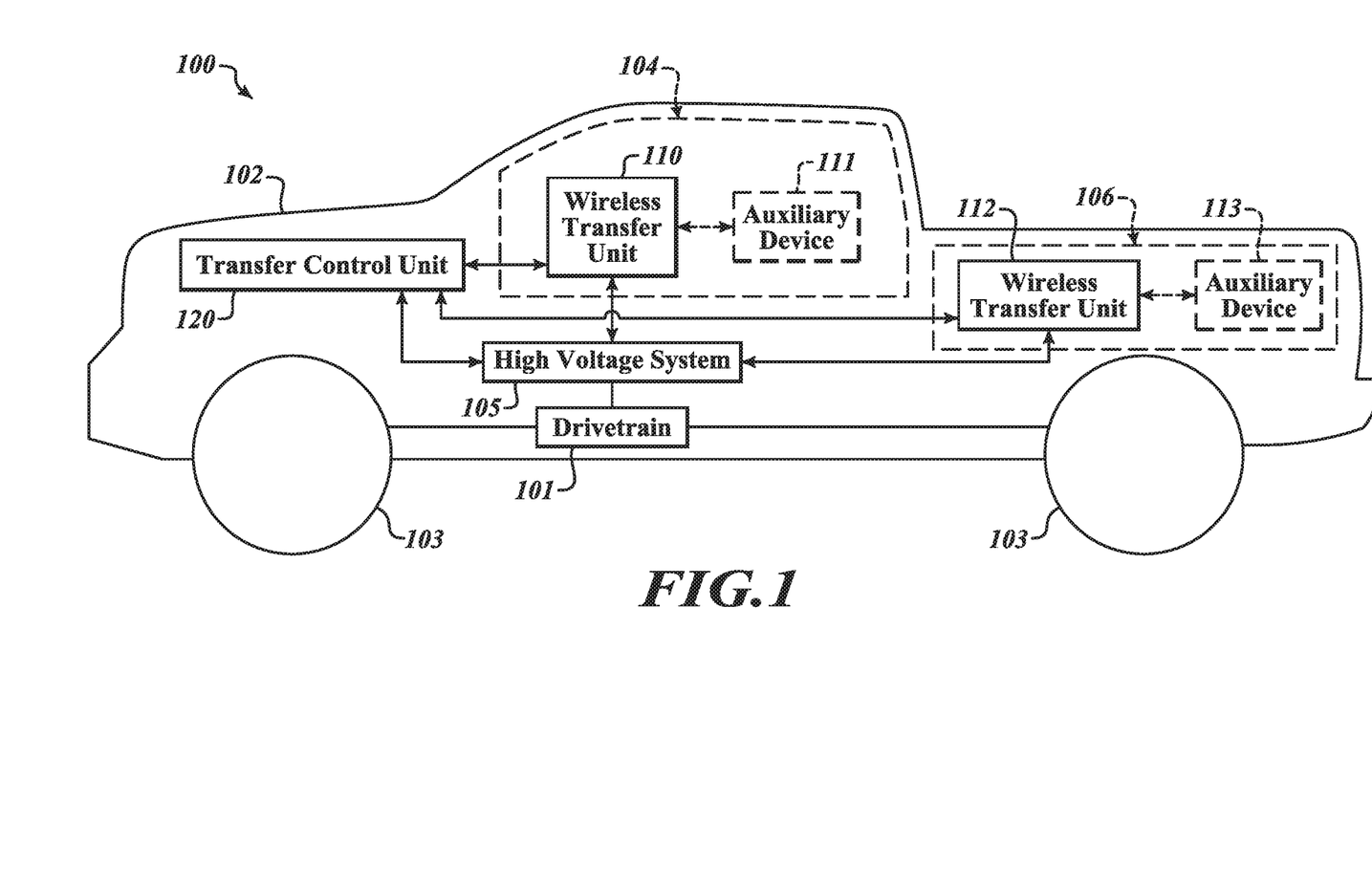
FIG. 1 is a block diagram in partial schematic form of a vehicle including one or more wireless transfer interfaces configured to exchange power with one or more auxiliary devices.

Referring to FIG. 1, a vehicle 100, which may be a passenger vehicle, truck, sport-utility vehicle (SUV), or other vehicle, includes a body 102 that accommodates the vehicle's onboard systems. The body 102 also includes a cabin 104 to receive an operator and possibly one or more passengers. The body 104 also includes a cargo area 106, such as a trunk or a truckbed. Among the onboard systems, the vehicle 100 includes a drivetrain 101 that provides motive force to wheels 103 to motivate the vehicle 100. In various embodiments, the vehicle 100 is an electrically-powered vehicle that includes a high voltage system 105 that provides electrical power capable of powering the drivetrain 101. It will be appreciated that an electrically-powered vehicle or a hybrid vehicle uses more electrical power than, for example, a gasoline-powered vehicle that primarily relies on internal combustion to provide power for its drivetrain.

In various embodiments, one or more wireless transfer units 110 and 112 are positioned about the body 102 of the vehicle 100 to provide for the transfer of electrical power between the high voltage system 110 and one or more auxiliary devices 111 and 113. The wireless transfer units 110 and 112 are bidirectional and, thus, are configured to transfer electrical power to or from the high voltage system 105. In various embodiments, the wireless transfer units 110 and 112 use inductive power transfer to transfer power between the high voltage power system 110 and the auxiliary devices 111 and 113, as further described below. Thus, when the auxiliary devices 111 and 113 are placed adjacent to the wireless transfer units 110 and 112, respectively, inductive power transfer permits electrical power to be wirelessly transferred therebetween. In various embodiments, the wireless transfer units 110 and 112 are in communication with a transfer control unit 120 that enables control of the transfer of electrical power between the wireless transfer units 110 and 112 and the auxiliary devices 111 and 113, as further described below. In various embodiments, the wireless transfer units 110 and 112 are coupled to the high voltage system 105 directly or through the transfer control unit 120.

In various embodiments, the one or more wireless transfer units 110 and 112 are positioned in the cabin 104 and/or the cargo area 106 of the vehicle 100. The wireless transfer unit 110 disposed in the cabin 104 may be positioned, for example, on a floorboard of the cabin 104. The auxiliary device 111 thus may be positioned on the floorboard adjacent to the wireless transfer unit 110 to exchange power with the high voltage system 105. When positioned on the floorboard, the wireless transfer unit 110 and the auxiliary device 111 may transfer electrical power without unduly consuming space so as to hamper the comfort of one or more occupants of the cabin 104. The wireless transfer unit 112 disposed in the cargo area 106 may be positioned at a side or in a corner of the cargo area 106. When positioned at a side or in a corner of the cargo area 106, the wireless transfer unit 112 and the auxiliary device 113 may transfer electrical power without unduly consuming space that may be used to carry other cargo aboard the vehicle 100.

The auxiliary devices 111 and 113 may include any number of electrically-powered devices that may desirably exchange power via one of the wireless transfer units 110 and 112 (FIG. 1) or other wireless transfer units in other vehicles or in other locations (not shown). For the sake of simplicity, the foregoing discussion of the auxiliary device expressly describes the auxiliary device 111 that exchanges electrical power with the wireless transfer unit 110, the wireless transfer unit 112, or another wireless transfer unit.

Figure 2:
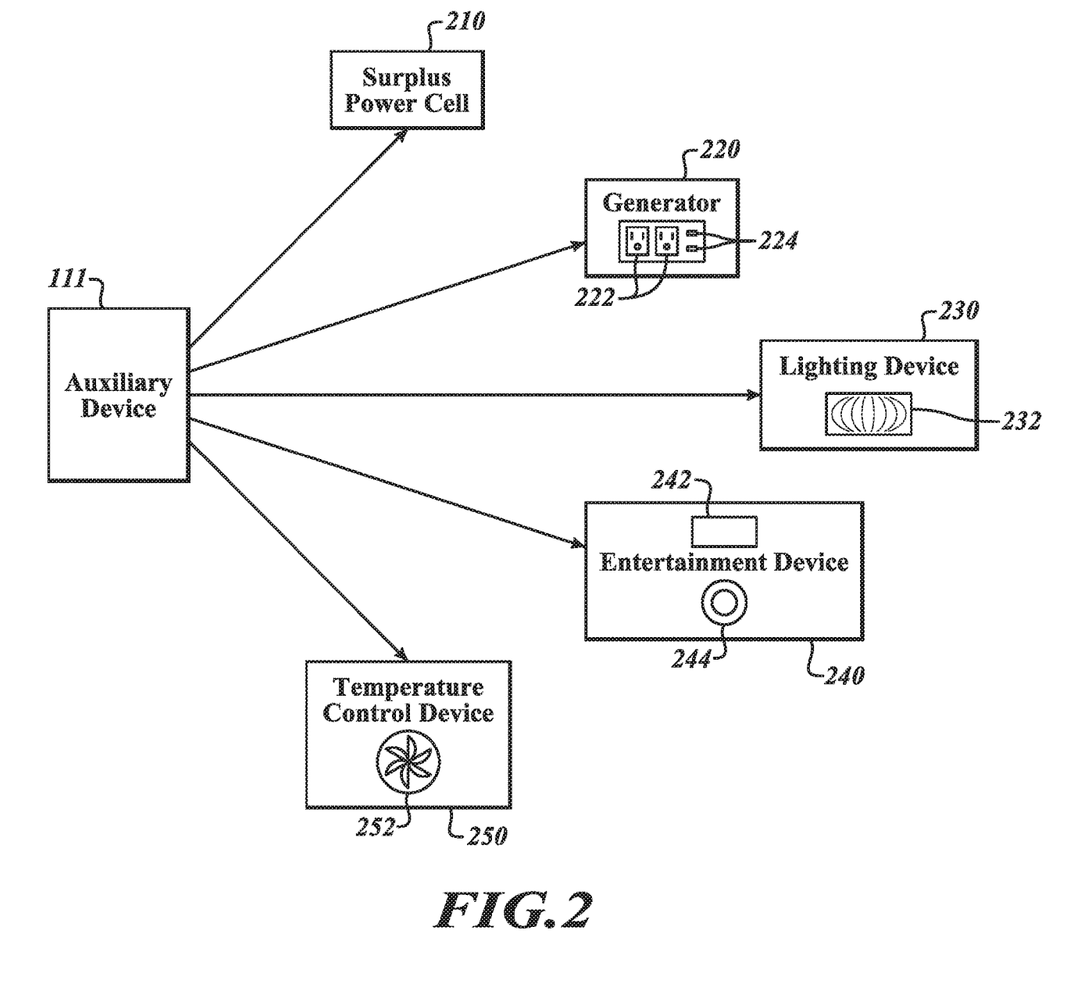
FIG. 2 is a block diagram in partial schematic form of auxiliary devices.

Referring to FIG. 2, the auxiliary device 111 may include any device that stores power or may supply power to the vehicle 100 (FIG. 1). In various embodiments, the auxiliary device may include a surplus power cell 210. The surplus power cell 210 may include one or more internal power cells (not shown) that is charged via an external charging device or using a charging system that is used to charge the high voltage system 105 (FIG. 1) of the vehicle 100. When positioned adjacent to the wireless transfer unit 110 (or the wireless transfer unit 112), the surplus power cell 210 may provide power to the high voltage system 105 to provide power to operate the drivetrain 101 and other systems aboard the vehicle 100. The surplus power cell 210 may be used with more than one vehicle, or may be used to wirelessly provide power to another electrically-powered device. The surplus power cell 210 may be chargeable via wireless transfer units as described therein or the surplus power cell 210 may be charged or may source power via electrical couplers (not shown in FIG. 2).

In various embodiments, the auxiliary device 111 also may include a solid-state generator 220. The generator 220, like the surplus power cell 210 and the other auxiliary devices described with reference to FIG. 2, includes one or more internal power cells (not shown in FIG. 2). In addition, the generator 220 includes outlets 222 and 224 to which electrically-powered devices may be connected to draw power from the generator 220. Household-type AC outlets 222 may allow for household devices (not shown) that receive AC power to be coupled with the AC outlets 222, thereby permitting the household devices to be "plugged into" the generator 220 and to draw power therefrom. Direct current outlets 224, such as USB sockets, also may be provided to power devices such as portable computers, tablet computers, smartphones, and other electronic devices that are charged or powered via USB cords. The generator 220 may be used portably away from the vehicle (FIG. 1) to provide power at a desired location. The generator 220, for example, may be used at a campsite, at a tailgate party, or at another outdoor party. When a power outage occurs, the generator 220 also may be used to power various devices in a home or office.

In various embodiments, the auxiliary device 111 may include a lighting device 230. The lighting device 230 may include one or more internal power cells (not shown) and one or more lighting elements 232. The lighting device 230 may be used at a campsite or outdoor party or to provide light in a home or office when a power outage occurs.

In various embodiments, the auxiliary device 111 may include an entertainment device 240. The entertainment device 240 may include one or more internal power cells (not shown), a display and/or one or more speakers. The entertainment device 240 also may include a disc drive, cassette deck, or other media interfaces to allow entertainment to be presented from various storage media. The entertainment device 240 may be used at a campsite or outdoor party or in a home or office when a power outage occurs.

In various embodiments, the auxiliary device 111 may include a temperature control device 250. The temperature control device 250 may include one or more internal power cells (not shown) and a fan 252 to circulate air. In addition, the temperature control device 250 also may include a thermoelectric heating or cooling device (not shown) to provide heated or cooled air. Like the other auxiliary devices herein described, the temperature control device 250 may be used at a campsite or outdoor party or in a home or office when a power outage occurs.

The auxiliary devices 210, 220, 230, 240, and 250 described with reference to FIG. 2 are included to provide examples of the types of auxiliary devices 111 that may be used with the wireless transfer units 110 and 112 of the vehicle 100 (FIG. 1). However, it will be appreciated that the auxiliary devices 210, 220, 230, 240, and 250 are provided only by way of example and not by way of limitation. Any electrical device that may wirelessly exchange power using the wireless transfer units 110 and 112 may also be used.

Figure 3A:
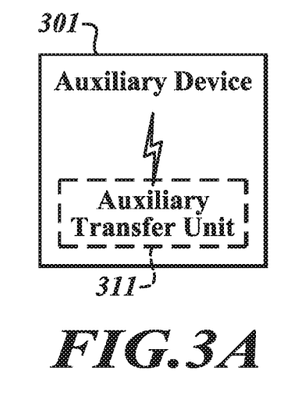
FIGS. 3A-3C are block diagrams in partial schematic form of auxiliary devices equipped with auxiliary transfer units to wirelessly exchange power with one or more of the wireless transfer interfaces of FIG. 1.
Figure 3B:
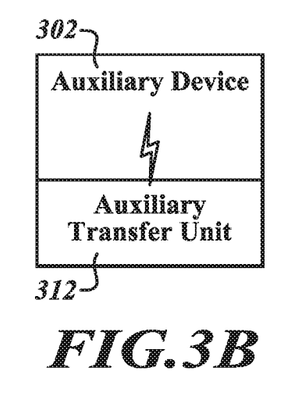
Figure 3C:
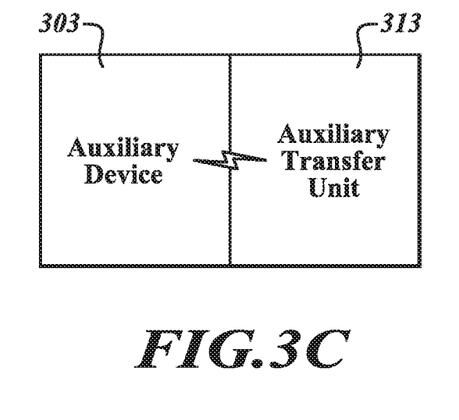

Referring to FIGS. 3A-3C, in various embodiments, auxiliary devices 301-303 may include various forms of auxiliary transfer units 311-313 that enable the auxiliary devices 301-303 to wirelessly exchange power with the wireless transfer units 110 and 112 of the vehicle 100 (FIG. 1). Referring to FIG. 3A, the auxiliary device 301 may include a built-in auxiliary transfer unit 311 in a base, on a side, or on top of the auxiliary device 301. Using the built-in auxiliary transfer unit 311, the auxiliary device 301 may be positioned adjacent the wireless transfer unit 110 or 112 with the auxiliary transfer unit 311 facing the wireless transfer unit 110 or 112 to facilitate the exchange of power therebetween.

Referring to FIG. 3B, the auxiliary device 302 may include an external auxiliary transfer unit 312. The external auxiliary transfer unit 312 may be configured to effect wireless transfer of power with the wireless transfer units 110 or 112 and, via an electrical coupling (not shown), be configured to provide power to or receive power from the auxiliary device 302. Attaching the external auxiliary transfer unit 312 to the auxiliary device 302 enables use of any number of electrically-powered devices or electrical storage devices with the wireless transfer units 110 or 112 of the vehicle 100. The external auxiliary transfer unit 312 also may be configured to be mechanically secured, either permanently or temporarily, with the auxiliary device 302 via adhesives, fasteners, or straps (not shown in FIG. 3B). The external auxiliary transfer unit 312 is configured to be disposed on a lower surface of the auxiliary device 302 when a wireless transfer unit is configured to wirelessly exchange power with a lower surface of an auxiliary device. A similar configuration may be used when the wireless transfer unit is configured to wirelessly exchange power with an upper surface of the auxiliary device.

Referring to FIG. 3C, the auxiliary device 303 may include another illustrative external auxiliary transfer unit 313. The external auxiliary transfer unit 313 is comparable to the external auxiliary transfer unit 312 (FIG. 3B), except that the external auxiliary transfer unit 313 is configured to be disposed on a side surface of the auxiliary device 302 when a wireless transfer unit is configured to wirelessly exchange power with a side surface of an auxiliary device. The external auxiliary transfer unit 313, like the external auxiliary transfer unit 312, also may be configured to be mechanically secured, either permanently or temporarily, with the auxiliary device 303 via adhesives, fasteners, or straps (not shown in FIG. 3B).

Figure 4A:
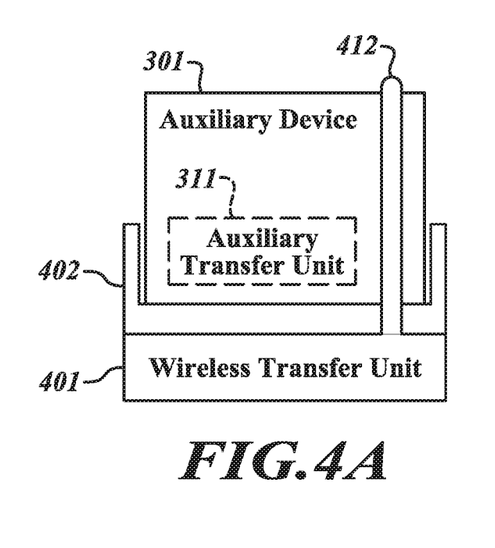
FIGS. 4A-4B are block diagrams of auxiliary device cradles configured to position auxiliary devices next to wireless transfer interfaces.
Figure 4B:
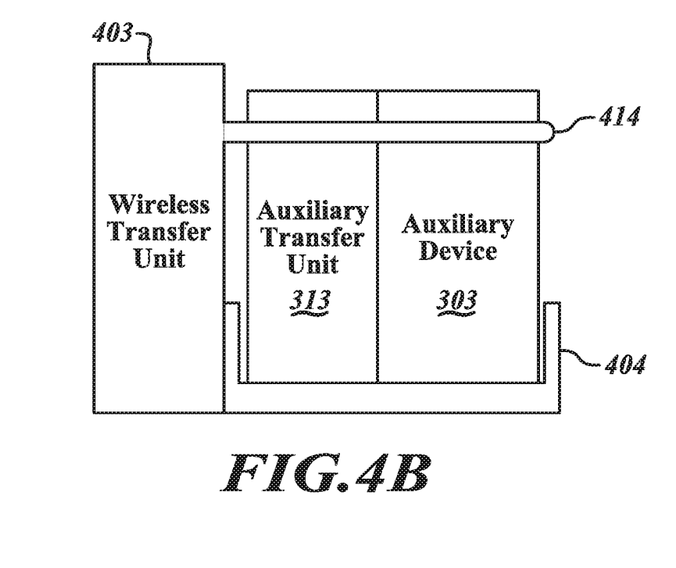

Referring to FIGS. 4A and 4B, in various embodiments, to facilitate transfer of electrical power with wireless transfer units, the vehicle 100 (not shown in FIGS. 4A and 4B) may include one or more auxiliary device cradles 402 and 404. The auxiliary device cradles 402 and 404 may position the auxiliary devices in proximity with the wireless transfer units 401 and 403. Close positioning of the auxiliary devices with the wireless transfer units 401 and 403 may help maintain the auxiliary devices in proximity to the wireless transfer units 401 and 403 to help aid in inductive transfer of electrical power therewith. Having the auxiliary device cradles 402 and 404 may be particularly helpful in moving vehicles to prevent the auxiliary devices from sliding or otherwise moving away from the wireless transfer units 401 and 403 and thereby reducing the effectiveness of wireless electrical power transfer.

Referring to FIG. 4A, in various embodiments the wireless transfer unit 401 is configured to exchange power with an auxiliary transfer unit 311 of the auxiliary device 301 (or the external auxiliary transfer unit 312 of the auxiliary device 302) that is configured to wirelessly exchange power through a bottom surface of the auxiliary device 301. An auxiliary device cradle 402 is positioned to receive and hold the auxiliary device 301 above the wireless transfer unit 401. The auxiliary device cradle 402 is sized to accommodate the auxiliary device 301 but to prevent movement of the auxiliary device 301 away from the wireless transfer unit 401. In various embodiments, the auxiliary device cradle 402 includes a securing device 412 to hold the auxiliary device 301 in the auxiliary device cradle 402. The securing device 412 may include an elastic strap stretchable to receive and then secure the auxiliary device 301 or another form of securable strap to receive and then secure the auxiliary device 301.

Referring to FIG. 4B, the wireless transfer unit 403 is configured to exchange power with an external auxiliary transfer unit 313 of the auxiliary device 303 (or a corresponding, side-disposed internal auxiliary transfer unit, not shown) that is configured to wirelessly exchange power through its side. An auxiliary device cradle 404 is positioned to receive and hold the auxiliary device 303 next to the wireless transfer unit 403. Again, the auxiliary device cradle 404 is sized to accommodate the auxiliary device 303 and its associated auxiliary transfer unit 313 but to prevent movement of the auxiliary device 303 away from the wireless transfer unit 403. In various embodiments, the auxiliary device cradle 404 include a securing device 414 to hold the auxiliary device 304 in the auxiliary device cradle 404. The securing device 414 may include an elastic strap stretchable to receive and then secure the auxiliary device 304 or another form of securable strap to receive and then secure the auxiliary device 303.

Figure 5:
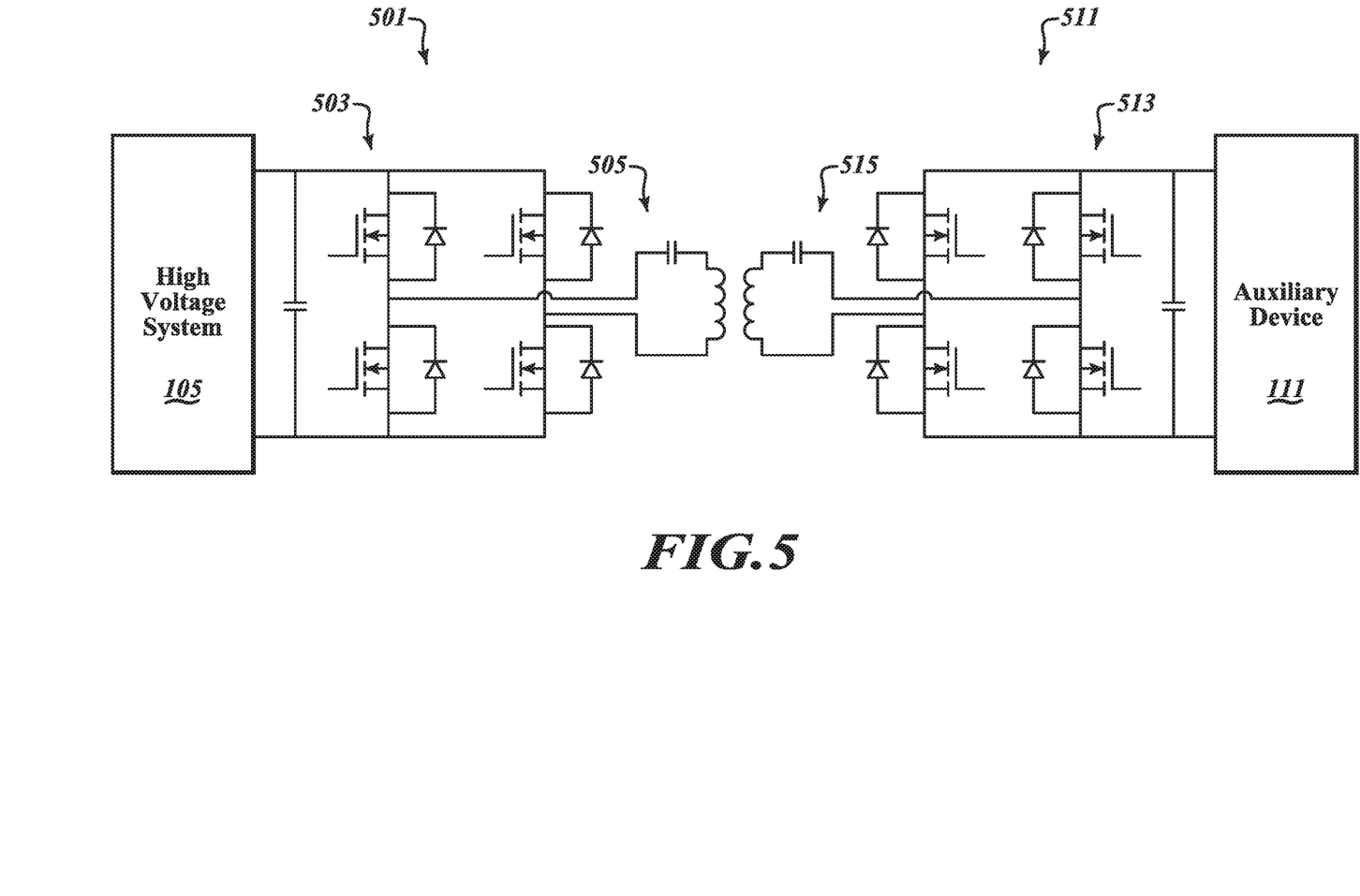
FIG. 5 is a schematic diagram of wireless transfer circuitry configured to transfer electrical power between a high voltage system of a vehicle and an auxiliary device.

Referring to FIG. 5, in various embodiments, wireless transfer circuitry 501 of a wireless transfer unit, such as wireless transfer units 111 and 113 (FIG. 1), and auxiliary transfer circuitry 511 of an auxiliary transfer unit, such as auxiliary transfer units 311-313 (FIGS. 3A-3C), include circuitry to facilitate wireless inductive electrical power transfer. The wireless transfer circuitry 501, which is coupled to the high voltage system 105 as previously described, includes an inverter circuit 503 and an inductor circuit 505. Correspondingly, the auxiliary transfer circuitry 511, which is coupled to the auxiliary device 112 as previously described, includes an inverter circuit 513 and an inductor circuit 515. When electrical power is transferred from the high voltage system 105 to the auxiliary device 111, electrical power from the high voltage system 105 is inverted by the inverter circuit 503 and then passed to the inductor circuit 505 to induce magnetic flux (not shown in FIG. 5). The magnetic flux is received by the inductor circuit 515, thereby inducing an electrical current that is passed through the inverter circuit 513 to the auxiliary device 111. When the electrical power is sourced by the auxiliary device 111 to the high voltage system 105, electrical power from the auxiliary device 111 is inverted by the inverter circuit 513 and then passed to the inductor circuit 515, thereby inducing magnetic flux (not shown in FIG. 5). The magnetic flux is received by the inductor circuit 505, thereby inducing an electrical current that is passed through the inverter circuit 503 to the high voltage system 105.

Figure 6:
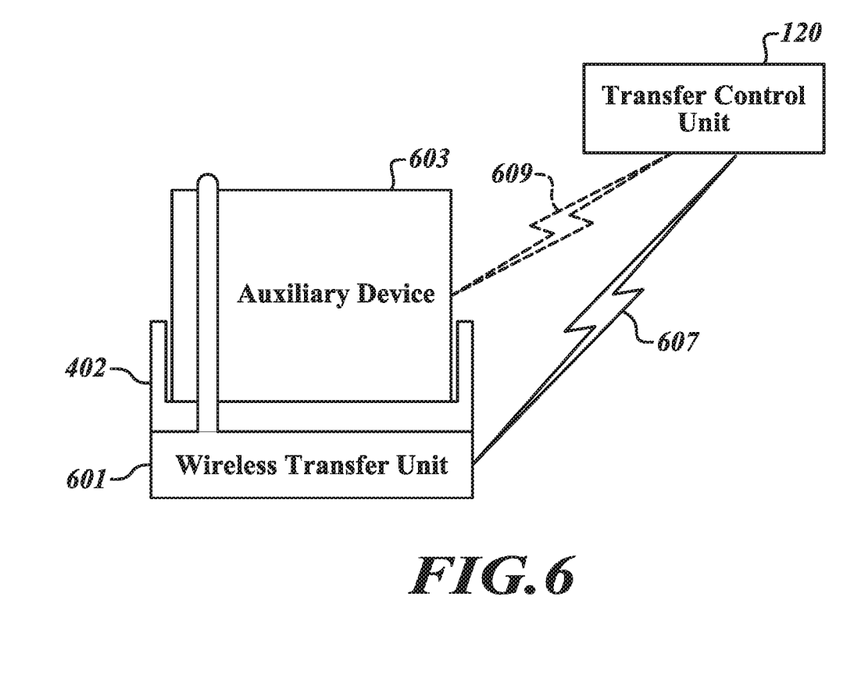
FIG. 6 is a block diagram of a transfer control unit operable to control a transfer of electrical power via a wireless transfer unit.

Referring to FIG. 6, the transfer control unit 120 of the vehicle 100 is configured to communicate with a wireless transfer unit 601, like the wireless transfer units 110 and/or 112 of the vehicle 100 (FIG. 1), and control the transfer of electrical power via the wireless transfer unit 601. In various embodiments, the transfer control unit 120 may receive a parameter to control how much electrical power is transferred via the wireless transfer 601 to an auxiliary device 603. It will be appreciated that the high voltage system 105 (FIG. 1) of the vehicle 100 may store a limited supply of electrical power. Accordingly, it may be desirable to limit or otherwise control a transfer of electrical power from the high voltage system 105 via the wireless transfer unit 601 to the auxiliary device 603. The transfer control unit 120 may exchange control signals 607 with the wireless transfer unit 601 to, for example, limit a total quantity of electrical power to be transferred to the auxiliary device 603 or specify a rate of transfer of electrical power between the high voltage system 105 and the auxiliary device.

Additionally, the transfer control unit 120 of the vehicle 100 may exchange control signals 609 with the auxiliary device 603 to determine a quantity of electrical power providable by or needed to charge the auxiliary device 603. The transfer control unit 120 may use this information to control a total quantity of electrical power to be transferred from or to the auxiliary device 603 or specify a rate of transfer of electrical power between auxiliary device 603 and the high voltage system 105.

Figure 7:
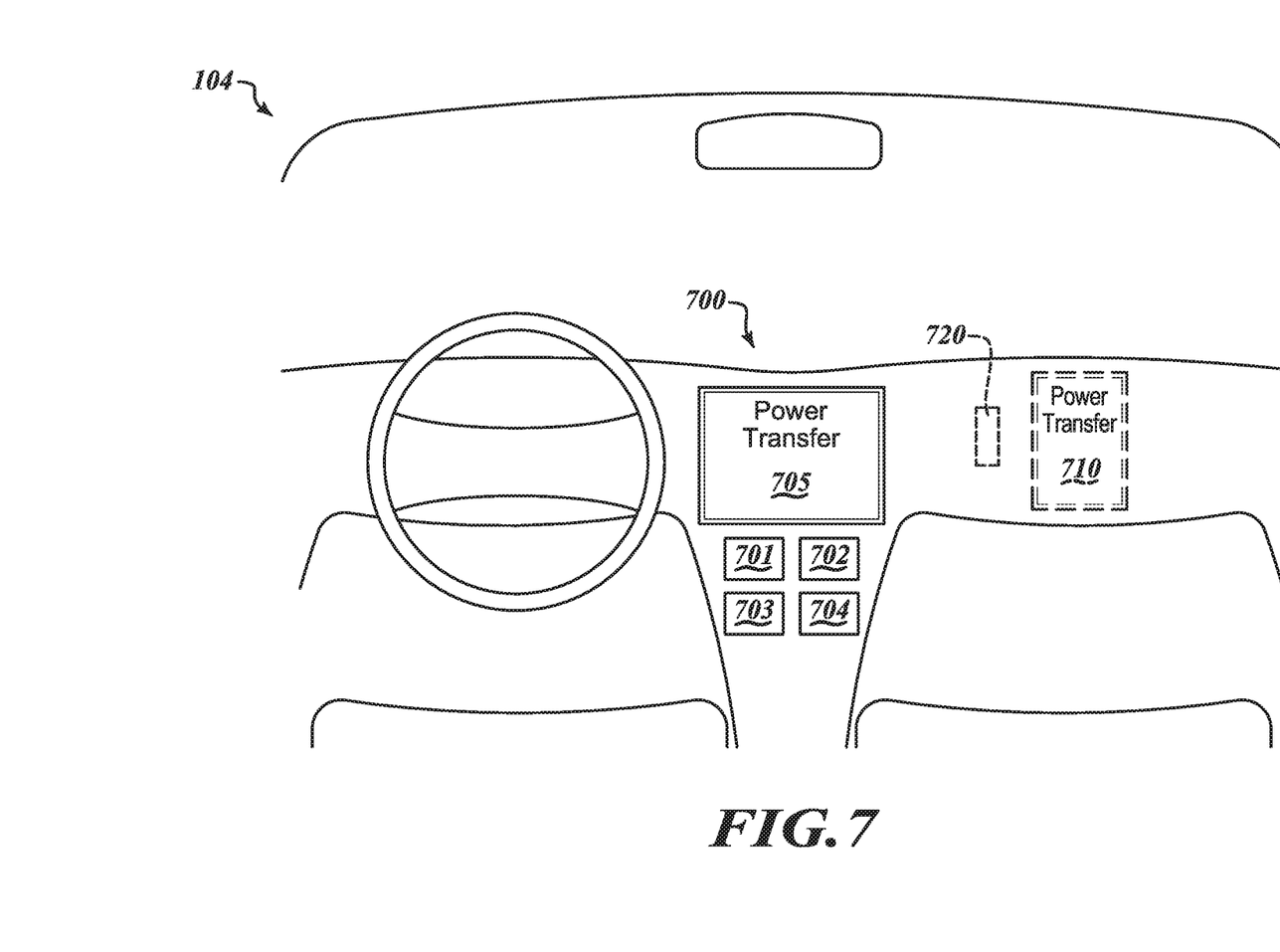
FIG. 7 is a block diagram in partial schematic form of a cabin of a vehicle providing for control of the transfer control unit of FIG. 6.

Referring to FIG. 7, the transfer control unit 120 may receive control inputs from an operator via a panel 700 included in the cabin 104 of the vehicle 100 (FIG. 1). The panel 700 may include a display 705 that displays information received regarding the auxiliary device 601, as described with reference to FIG. 6, or selected quantities or rates chosen by an operator in managing the transfer of electrical power. An operator may use controls 701-704 to control the transfer of electrical power or the display 705 may include a touchscreen enabling the operator to control the transfer of power directly via the display 705. In various embodiments, a portable computing device 710, such as a smartphone, smartwatch, or other portable computing device may communicate with the transfer control unit 120 via a wireless communications device 720 to control the transfer of power.

Figure 8:
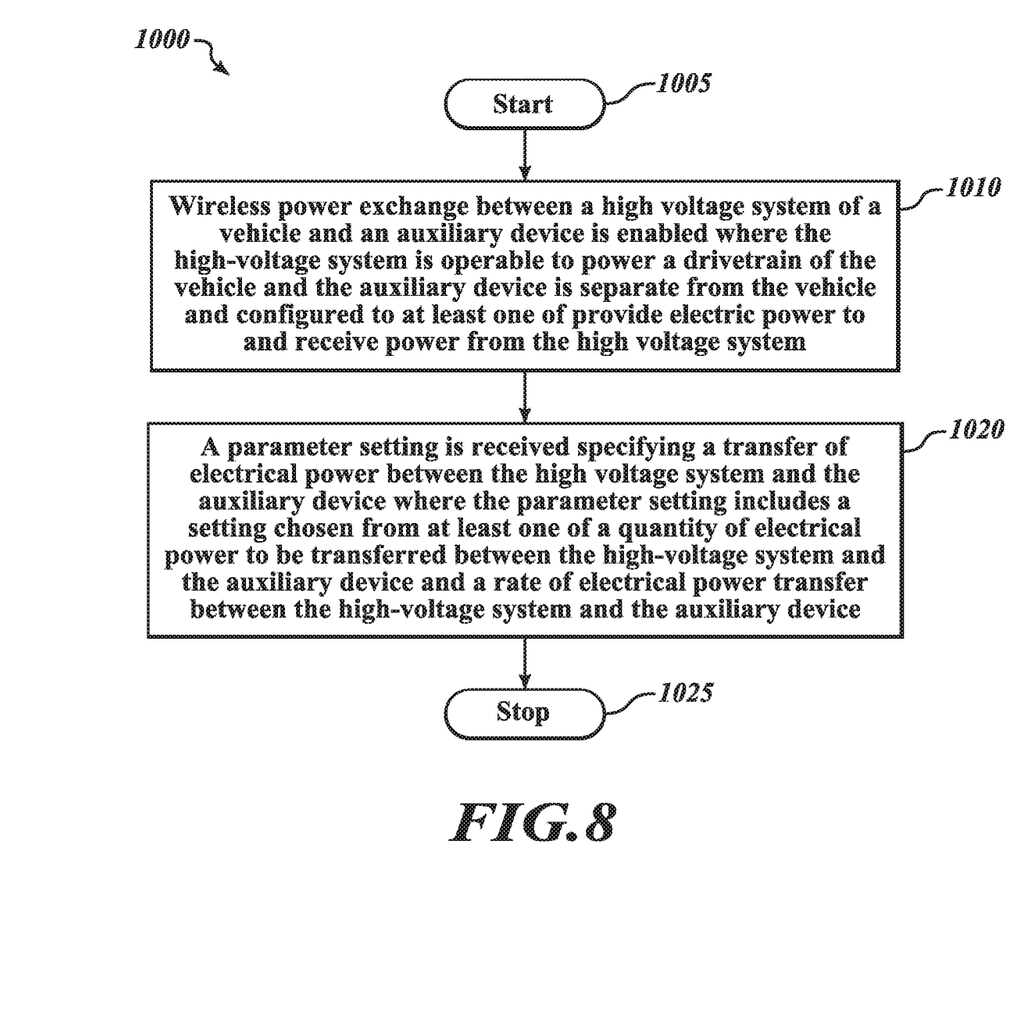
FIG. 8 is a flow chart of an illustrative method of method of transferring power between a high voltage device and an auxiliary device.

Referring to FIG. 8, in various embodiments an illustrative method 800 of transferring power between a high voltage device and an auxiliary device is provided. The method 800 starts at a block 805. At a block 810, a wireless power exchange between a high voltage system of a vehicle and an auxiliary device is enabled where the high voltage system is operable to power a drivetrain of the vehicle and the auxiliary device is separate from the vehicle and configured to at least one of provide electric power to and receive power from the high voltage system. At a block 820, a parameter setting is received specifying a transfer of electrical power between the high voltage system and the auxiliary device where the parameter setting includes a setting chosen from at least one of a quantity of electrical power to be transferred between the high voltage system and the auxiliary device and a rate of electrical power transfer between the high voltage system and the auxiliary device. The method 800 ends at 825.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. An apparatus comprising:
a wireless transfer unit electrically coupled with a high voltage system of a vehicle and configured to enable wireless bidirectional power exchange between the high voltage system and an auxiliary device, wherein the high voltage system is operable to power a drivetrain of the vehicle and the auxiliary device is separate from the vehicle and configured to at least one of provide electric power to and receive power from the high voltage system; and
a transfer control unit configured to communicate with the wireless transfer unit and control at least one parameter specifying a transfer of electrical power between the high voltage system and the auxiliary device.

2. The apparatus of claim 1, wherein the wireless transfer unit includes a first inductive coil system configured to inductively exchange electrical power with a second inductive coil system coupled with an auxiliary voltage system of the auxiliary device.

3. The apparatus of claim 1, wherein the at least one parameter includes at least one of a power transfer parameter chosen from:
a quantity of electrical power to be transferred between the high voltage system and the auxiliary device; and
a rate of electrical power transfer between the high voltage system and the auxiliary device.

4. The apparatus of claim 1, further comprising a communications interface configured to enable the transfer control unit to communicate with the auxiliary device about the one or more parameters specifying the transfer of electrical power between the high voltage system and the auxiliary device.

5. The apparatus of claim 4, wherein the communications interface enables communication of an auxiliary parameter chosen from a transfer including at least one of:
a quantity of auxiliary power transferrable from the auxiliary device to the high voltage system; and a quantity of auxiliary device depletion indicating a quantity of electrical power that would fully charge the auxiliary device.

6. The apparatus of claim 1, further comprising an auxiliary device cradle configured to receive the auxiliary device at a location adjacent the wireless transfer unit.

7. The apparatus of claim 6, wherein the device cradle is disposed in a receiving location chosen from a section of the vehicle including at least one of a cabin, a truckbed, and a trunk.

8. The apparatus of claim 6, further comprising a securing mechanism configured to secure the auxiliary device adjacent to the wireless transfer unit.

9. The apparatus of claim 1, further comprising an auxiliary wireless transfer unit configured to be coupled to a power system of the auxiliary device and to exchange power with the wireless transfer unit.

10. The apparatus of claim 1, wherein the auxiliary device includes a surplus power cell configured to provide power to the high voltage system.

11. A vehicle comprising:
a vehicle body including at least one receiving section including:
a cabin configured to receive an operator;
a truckbed; and
a trunk;
a drivetrain configured to motivate the vehicle;
an operator control system configured to allow the operator to direct operations of the vehicle;
a high voltage system operable to power the drivetrain;
a wireless transfer unit positioned in the receiving section and electrically coupled with a high voltage and configured to enable wireless bidirectional power exchange between the high voltage system and an auxiliary device, wherein the high voltage system is operable to power a drivetrain of the vehicle and the auxiliary device is separate from the vehicle and configured to at least one of provide electric power to and receive power from the high voltage system; and
a transfer control unit configured to communicate with the wireless transfer unit and control at least one parameter specifying a transfer of electrical power between the high voltage system and the auxiliary device.

12. The vehicle of claim 11, wherein the wireless transfer unit includes a first inductive coil system configured to inductively exchange electrical power with a second inductive coil system coupled with an auxiliary voltage system of the auxiliary device.

13. The vehicle of claim 11, wherein the at least one parameter includes at least one of a power transfer parameter chosen from:

a quantity of electrical power to be transferred between the high voltage system and the auxiliary device; and
a rate of electrical power transfer between the high voltage system and the auxiliary device.

14. The vehicle of claim 11, further comprising a communications interface configured to enable the transfer control unit to communicate with the auxiliary device about the one or more parameters specifying the transfer of electrical power between the high voltage system and the auxiliary device.

15. The vehicle of claim 14, wherein the communications interface enables communication of an auxiliary parameter chosen from a transfer including at least one of:
a quantity of auxiliary power transferrable from the auxiliary device to the high voltage system; and
a quantity of auxiliary device depletion indicating a quantity of electrical power that would fully charge the auxiliary device.

16. The vehicle of claim 11, further comprising an auxiliary device cradle configured to receive the auxiliary device at a location adjacent the wireless transfer unit.

17. The vehicle of claim 16, further comprising a securing mechanism configured to secure the auxiliary device adjacent to the wireless transfer unit.

18. The vehicle of claim 11, further comprising an auxiliary wireless transfer unit configured to be coupled to a power system of the auxiliary device and to exchange power with the wireless transfer unit.

19. The vehicle of claim 11, wherein the auxiliary device includes a surplus power cell configured to provide power to the high voltage system.

20. A method comprising:
enabling wireless power exchange between a high voltage system of a vehicle and an auxiliary device, wherein the high voltage system is operable to power a drivetrain of the vehicle, wherein the auxiliary device is separate from the vehicle and configured to at least one of provide electric power to and receive power from the high voltage system; and
receiving a parameter setting specifying a transfer of electrical power between the high voltage system and the auxiliary device wherein the parameter setting includes a setting chosen from at least one of:
a quantity of electrical power to be transferred between the high voltage system and the auxiliary device; and
a rate of electrical power transfer between the high voltage system and the auxiliary device.

* * * * *